US008022259B2

(12) United States Patent
Bauer et al.

(10) Patent No.: US 8,022,259 B2
(45) Date of Patent: Sep. 20, 2011

(54) SLURRY HYDROCONVERSION OF BIORENEWABLE FEEDSTOCKS

(75) Inventors: Lorenz Bauer, Des Plaines, IL (US); Michael McCall, Des Plaines, IL (US); Edwin Boldingh, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 606 days.

(21) Appl. No.: 12/130,205

(22) Filed: May 30, 2008

(65) Prior Publication Data

US 2009/0299112 A1 Dec. 3, 2009

(51) Int. Cl.
*C07C 4/00* (2006.01)
*C10G 1/00* (2006.01)

(52) U.S. Cl. ........ 585/240; 585/242; 585/638; 585/733; 208/15; 208/16; 208/113

(58) Field of Classification Search .................. 585/240, 585/242, 638, 733; 208/15, 16, 111.35, 113, 208/143
See application file for complete search history.

(56) References Cited

U.S. PATENT DOCUMENTS

| | | | |
|---|---|---|---|
| 4,134,825 A | 1/1979 | Bearden, Jr. et al. | |
| 4,194,967 A | 3/1980 | Gatsis | |
| 4,226,742 A | 10/1980 | Bearden, Jr. et al. | |
| 4,420,644 A | 12/1983 | Huibers et al. | |
| 4,740,925 A | 4/1988 | Kaszubinski et al. | |
| 4,795,841 A * | 1/1989 | Elliott et al. | 585/240 |
| 4,824,824 A | 4/1989 | Matsushita et al. | |
| 4,962,269 A * | 10/1990 | LaPierre et al. | 585/739 |
| 5,180,868 A | 1/1993 | Baker et al. | |
| 5,578,197 A | 11/1996 | Cyr et al. | |
| 5,705,722 A * | 1/1998 | Monnier et al. | 585/240 |
| 5,959,167 A * | 9/1999 | Shabtai et al. | 585/242 |
| 6,139,723 A | 10/2000 | Pelrine et al. | |
| 6,143,856 A * | 11/2000 | Roy et al. | 528/129 |
| 6,172,272 B1 | 1/2001 | Shabtai et al. | |
| 6,217,706 B1 | 4/2001 | El-Shall et al. | |
| 7,578,927 B2 * | 8/2009 | Marker et al. | 208/67 |
| 7,807,599 B2 * | 10/2010 | Maesen et al. | 502/216 |
| 7,816,298 B2 * | 10/2010 | Maesen et al. | 502/216 |
| 7,838,696 B2 * | 11/2010 | Maesen et al. | 556/28 |
| 2005/0241993 A1 | 11/2005 | Lott et al. | |
| 2006/0186020 A1 | 8/2006 | Gomes | |
| 2006/0264684 A1* | 11/2006 | Petri et al. | 585/250 |
| 2007/0260102 A1* | 11/2007 | Duarte Santiago et al. | 585/733 |

FOREIGN PATENT DOCUMENTS

EP 0 366 138 * 8/1994
EP 0366138 B1 8/1994

OTHER PUBLICATIONS

Zhang, Shuyi, "A Review of Slurry-Phase Hydrocracking Heavy Oil Technology," *Energy and Fuels*, vol. 21, No. 6, pp. 3057-3062 (2007).
PCT International Search Report and Written Opinion for PCT/US2009/041643 dated Sep. 21, 2009; 8 pages.

* cited by examiner

*Primary Examiner* — Nina Bhat
(74) *Attorney, Agent, or Firm* — Frank S Molinaro

(57) ABSTRACT

A method for hydroconversion of a combined feed of at least one low value petroleum derived hydrocarbon and at least one biorenewable feedstock in a hydroconversion reaction zone in the presence of a hydroconversion catalyst at hydroconversion reaction conditions for a period of time sufficient to form a hydroconversion reaction product.

15 Claims, 1 Drawing Sheet

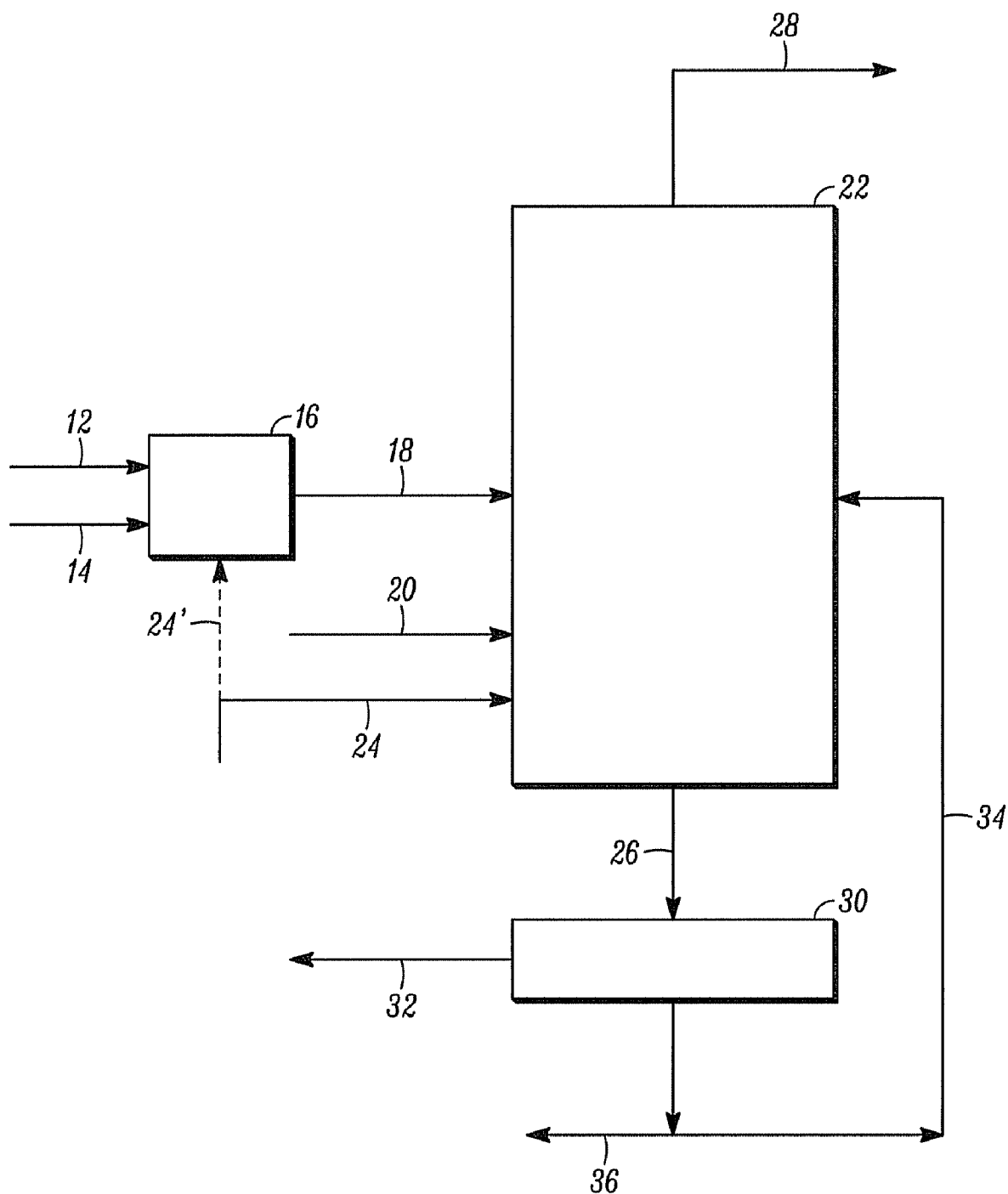

SLURRY HYDROCONVERSION OF BIORENEWABLE FEEDSTOCKS

BACKGROUND OF THE INVENTION (1) Field of the Invention

This invention concerns processes for the hydroconversion of a slurry-phase combined feed comprising at least one low value petroleum derived hydrocarbon and at least one biorenewable feedstock.

(2) Description of the Art

Upgrading heavy oils, bitumen and coal liquids into a lighter hydrocarbon liquids such as diesel, naphtha and gasoline is important in order to maximize the amount of useful hydrocarbon materials that can be derived from crude oil and other heavy hydrocarbon feedstocks.

One problem faced in upgrading heavy oils is the lack of access to lighter hydrocarbon steams that can be combined with heavy oils to improve their conversion into lighter hydrocarbon streams. At the same time, there is a need to identify and employ refinery feed sources that are not based upon crude oil for upgrading or conversion into useful product streams such as diesel, gasoline, kerosene, naphtha and so forth. In particular, there is a need to identify renewable biological sources of such materials.

Materials such as particulate biological materials, pyrolysis oils and lignocellulosic biomass based materials have been identified as possible biorenewable sources of oils and polymers. However, one problem with using such biorenewable sources as refinery process feeds is that they are often in a solid as opposed to liquid form, they form a multi-phase liquid, and/or they contain large amounts of oxygen, all of which cause difficulties is processing biorenewable feeds in traditional refining processes. There is a need, therefore to devise methods and processes for refining multi-phase feedstocks including biorenewable materials in conventional refining processes.

SUMMARY OF THE INVENTION

The present invention solves one or more of the problems identified above by combining a low value petroleum derived hydrocarbon feedstock with at least one biorenewable feedstock to form a multi-phase combined feed and thereafter reacting the combined feed in a conventional refinery type hydroconversion reaction zone to form a hydroconversion reaction product. The inventors have surprisingly discovered that the combination of a low value petroleum derived hydrocarbon and a biorenewable feedstock forms a synergistic combined feed that, when processed in a hydroconversion reaction zone, produces a hydroconversion reaction zone product with enhanced yields or properties in comparison to reaction products of 100% feeds of either feed ingredient. Indeed, it is often impossible to process feed streams of 100% solid biomass in conventional refinery processes. In general, the biorenewable feedstock is blended with the low value petroleum derived hydrocarbon at varying concentrations prior to or during hydroconversion. The combined feed is further combined with a solid catalyst either before or after introduction into a hydroconversion reaction zone.

In one aspect, this invention is a hydroconversion method comprising the steps of: combining a low value petroleum derived hydrocarbon with at least one biorenewable feedstock to form a combined feed; reacting the combined feed with at least one catalyst in a hydroconversion reaction zone at hydroconversion reaction conditions for a period of time sufficient to form a hydroconversion reaction product; and withdrawing the hydroconversion reaction product from the reaction zone.

Another aspect of this invention is a method for improving the hydroconversion of a heavy hydrocarbon feedstock comprising the steps of: admixing from about 50 wt % to about 99 wt % of a low value petroleum derived hydrocarbon with from about 1 wt % to about 50 wt % of at least one lignocellulosic biomass feedstock to form a combined feed; reacting the combined feed with at least one sulfide containing micro particulate dispersed metal catalyst in a hydroconversion reaction zone at hydroconversion reaction conditions including a temperature of from about 350° C. to about 500° C. and a pressure of from about 1200 psig to about 2500 psig for a period of time sufficient to form a hydroconversion reaction product; and withdrawing the hydroconversion reaction product from the reaction zone wherein the hydroconversion reaction product includes a naphtha yield on a wt % product basis that is greater than the naphtha yield on a wt % product basis of a straight low value petroleum derived hydrocarbon feed at the same hydroconversion reaction conditions and using the same type and amount of hydroconversion catalyst.

Still another aspect of this invention is a hydroconversion reaction zone comprising: a hydroconversion reactor vessel having one or more feed inlets and one or more product outlets, the reactor vessel containing a combined feed and a sulfided micro particulate dispersed metal catalyst wherein the reactor vessel is maintained at a temperature of from about 350° C. to about 500° C. and a pressure of from about 1000 psig to about 3000 psig; one or more inlet streams that together form a combined feed further comprising hydrogen, a low value petroleum derived hydrocarbon and at least one biorenewable feedstock; and one or more outlet streams that together form a hydroconversion reactor product.

DESCRIPTION OF THE FIGURE

FIG. 1 is one hydroconversion process schematic and reaction zone embodiment of this invention.

DETAILED DESCRIPTION OF THE INVENTION

The present invention relates to hydroconversion methods and reaction zones for synergistically reacting a combined feed including a low value petroleum derived hydrocarbon and at least one biorenewable feedstock to form a hydroconversion reaction product. This invention is also a hydroconversion reaction zone that includes a hydroconversion reactor that operates at hydroconversion reaction conditions on the combined feed described above in the presence of hydrogen to synergistically convert the combined feed into a hydroconversion reaction product.

The methods and hydroconversion reaction zones of this invention are described below generally with reference to FIG. 1. FIG. 1 is a schematic of one embodiment of a hydroconversion method and reaction zone of this invention. In FIG. 1, a low value petroleum derived hydrocarbon feed 12 and a biorenewable feedstock stream 14 is combined to form a multi-phase combined feed stream 18. Combined feed stream 18 may be formed by adding a low value petroleum derived hydrocarbon feed stream 12 and a biorenewable feed steam 14 directly into hydroconversion reaction zone 22 where the feed ingredients admix. Alternatively, low value petroleum derived hydrocarbon feed 12 and biorenewable feedstock stream 14 may be initially combined in a pre-feed reaction vessel 16 or they may be combined in a feed conduit and thereafter combined feed stream 18 is directed into hydroconversion reaction zone 22. It is anticipated that biorenewable feedstock stream 14 will generally be a solid particulate material although the use of liquid biorenewable feedstocks also falls within the scope of the present invention. When the biorenewable feedstock stream 14 is a solid particulate material the biorenewable feedstock 14 may be combined with liquid low value petroleum derived hydrocarbon feedstock 12 in a pre-feed vessel 16 to form a combined slurry feed that can be intimately admixed before introduction into hydroconversion reaction zone 22.

The low value petroleum derived hydrocarbon stream 12 can be any type of petroleum derived hydrocarbon stream that is known to be usefully processed in a hydroconversion reaction zone. Examples of useful low value petroleum derived hydrocarbon feed streams include, but are not limited to heavy oil vacuum bottoms, vacuum residue, FCC slurry oil and other heavy hydrocarbon-derived oils. Hydrocarbons containing greater than 10% aromatics are preferred because they are better solvents for the biorenewable materials and derived products. Especially useful as low value petroleum derived hydrocarbon feed stocks are petroleum-derived hydrocarbons having 80 volume percent or more materials with a boiling point greater than 1050° F. Also useful are petroleum derived hydrocarbons including at least 80 wt % hydrocarbons having a boiling point greater than 650° F. and comprised of 10-50% aromatic hydrocarbons.

Useful biorenewable feedstocks may include but are not limited to lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. Lignocellulosic biomass, or cellulosic biomass as used throughout the remainder of this document, consists of the three principle biopolymers cellulose, hemicellulose, and lignin. The ratio of these three components varies depending on the biomass source. Cellulosic biomass might also contain lipids, ash, and protein in varying amounts. The economics for converting biomass to fuels or chemicals depend on the ability to produce large amounts of biomass on marginal land, or in a water environment where there are few or no other significantly competing economic uses of that land or water environment. The economics can also depend on the disposal of biomass that would normally be placed in a landfill. Other useful biorenewable feedstocks are pyrolysis oils. Biorenewable feedstocks, such as lignocellulosic biomass, contain organic polymeric materials that are highly polar. Without being bound by these theories, the inventors hypothesize that these polar components may contribute to the synergistic results of processing the combined feed in a hydrocarbon conversion process by serving as a surfactant/solvent for components in the low value petroleum derived hydrocarbon feedstock. Alternatively or in addition, the polar components of the biorenewable feedstocks may also aid in disrupting agglomerates of the inorganic catalytic components in order to increase the effective surface area of catalyst in the hydrocarbon conversion reaction zone. Alternatively or in addition, it may be the heavy low-value feed that helps provide a synergistic effect by facilitating the conversion of the biorenewable feed into useful products perhaps by being a better $H_2$ solvent thereby transferring $H_2$ more efficiently.

A sub-class of biorenewable biomass useful as feedstocks are lignins. Examples of useful lignins include, but are not limited to, Kraft lignins, organosolve lignins, wood-derived lignins, agricultural-derived lignins, municipal waste-derived lignins and combinations thereof. A preferred lignin is a Kraft lignin.

Another useful class of biorenewable hydrocarbons are pyrolysis oils. The term pyrolysis oil or pyrolytic oil refers to liquid and solid (char) material extracted by destructive distillation from biomass and in particular dried biomass. The destructive distillation occurs in a reactor operating at a temperature of about 500° C. with subsequent cooling. Pyrolytic oil normally contains levels of oxygen that can be as high as 50 wt % (due, in part, to a high water content of from about 8 wt % to about 20 wt % or more) and that are too high for it to be considered a hydrocarbon and, as such, it is distinctly different from similar petroleum products.

When the biorenewable feedstock is a solid material, it will be indroduced into the hyderconversion reaction zone as a particulate material. The particulate biorenewable feedstock may be any size of particle that can be processed in the chosen hydroconversion reaction zone. However, it is preferred that a particulate biorenewable feedstock will have a mesh size less than about 50, more preferably less than about 100 mesh and most preferably less than about 200 mesh.

The ratio of the low value petroleum derived hydrocarbon feedstock to the biorenewable feedstock in the combined feed may vary significantly. In particular, the amount of biorenewable feedstock in the combined feed will range from a surfactant acting amount up to about 75 weight percent of the combined feed stream. In an another embodiment, the combined feed will contain one or more biorenewable feedstocks in an amount ranging from about 1 to about 50 weight percent. The term "surfactant acting amount" refers to an amount of biorenewable feedstock sufficient to improve a low value petroleum derived hydrocarbon hydroconversion reaction product yield of a desired product—such as light hydrocarbon yield or that reduces the hydroconversion reaction product yield of an undesired product. Alternatively, the surfactant acting amount of biorenewable feedstock is an amount sufficient to wet the inorganic catalyst to either disrupt catalyst agglomerates and/or to improve the surface area of the catalyst exposed to the low value petroleum derived hydrocarbon feed.

Hydroconversion reaction zone 22 will include an admixture of the combined feed 18 and a catalyst stream 24. Catalyst stream 24 may be directed into hydroconversion reaction zone 22 directly or it may be admixed with the low value petroleum derived hydrocarbon feed stream, the biorenewable feedstock or combined feed stream 18 before the feeds are introduced into the hydroconversion reaction zone.

In order to improve catalyst dispersion in the hydroconversion reaction zone, the catalyst may be premixed with a cutting stock to form a catalyst slurry prior to the addition of the catalyst into the reaction zone or into combination which one or more of the hydroconversion reaction zone feed streams. The cutting stock(s) may be any type of material known in the art for creating a catalyst feed slurry. In the present invention, one useful cutting oil is a pyrolysis oil or any other type of biorenewable oil that is useful in the present invention. In another alternative, the cutting stock may be a hydroconversion reaction zone recycle stream, byproduct or product stream material. In yet another alternative, the cutting stock may be an inexpensive light oil such as mineral oil.

The catalyst used in the methods and processes of this invention may be any catalyst that is known to be useful in a hydroconversion reaction process and in particular slurry phase hydroconversion reaction processes. For purposes of this invention, the hydroconversion reactor and reaction zone includes an active hydroconversion catalyst. However, the catalyst feed can include an active catalyst and/or catalyst precursor ingredients. In other words, the catalyst feed does not have to include an active catalyst. Instead, the catalyst feed may include ingredient(s) that react together or that react with ingredients in the combined feed or in the hydroconversion reactor to form an active hydroconversion catalyst in the hydroconversion reaction zone.

Some examples of useful classes of hydroconversion catalysts include, but are not limited to, heterogeneous solid powder catalysts, homogeneous water soluble dispersed catalysts, oil soluble dispersed catalysts, and homogenous solid powder catalysts. Homogeneous and heterogeneous catalysts may in particular be metals such as cobalt, molybdenum, nickel, iron, vanadium, tin, copper, ruthenium and other Group IV-VIII transition metal containing catalysts. Fine catalytic powders such as powdered coals and limonite may be used as well. The metals can be added to the hydroconversion reaction zone in many forms including as metal salts like ammonium heptamolybdate, and iron sulfate. The metals can be added as oil or water soluble species.

Many oil-soluble dispersed catalysts have been developed for use in hydroconversion processes. Useful oil-soluble catalysts are typically produced by the combination of an oxide, a sulfide, or a salt of metal selected from group IV through group VIII including transition metal-based catalysts derived from the organic acid salt or metal-organic compounds of vanadium, tungsten, chromium, iron, molybdenum etc. One example of such a catalyst is the reaction product of a vanadium catalyst precursor, $V_2O_5$, and ammonium sulfide which form an ammonium salt of the vanadium sulfide as disclosed in U.S. Pat. No. 4,194,967 B1. The vanadium sulfide catalyst forms a colloidal dispersion with a hydrocarbon feedstock. Other oil-soluble dispersed catalysts include molybdenum alicyclic aliphatic carboxylic acids and molybdenum naphthenate oil-soluble metal compound as described in U.S. Pat. No. 4,226,742 B1. Molybdenum naphthenate and nickel di-2-ethylhexanoate have been used as metal precursors for hydroconversion catalysts. Examples of some other useful oil-dispersed catalysts include molybdenum dithiocarboxylate, nickel naphthenate, ammonium molybdates, iron naphthenate, molybdenum lithiocarboxylate (MoDTC), molybdenum lithiophosphate (MODTP) as well as their mixtures. Still other useful oil-soluble dispersed catalysts are disclosed in, for example, U.S. Pat. Nos. 4,824,821 B1, 4,740,925 B1, 5,578,197 B1, and 6,139,723 B1 the specifications of each of which are incorporated herein by reference. Other useful catalysts including $FeSO_4$ are disclosed in U.S. Pat. No. 4,299,685 B1, the specification of which is incorporated herein by reference.

Examples of useful water-soluble dispersed catalysts include, but are not limited to sodium molybdate, nickel nitrate, and iron nitrate precursors of water-soluble multi-metal composite catalysts water-soluble ammonium heptamolybdate (AHM), ammonium paramolybdate (APM), and ammonium tetrathiomolybdate (ATM)

The catalysts may be used alone or they may be further enhanced by adding small amounts of promoters and other well know catalyst additives such as small percentages of at least one active metal such as palladium, platinum, nickel, tungsten or mixtures thereof.

The hydroconversion reactor or reaction zone will include an effective amount of catalyst. An effective amount of catalyst is an amount sufficient to convert at least some of the combined feed into lighter hydrocarbon products. Preferably, an effective amount is an amount sufficient to produce a synergistic effect as discussed below. The actual effective amount of catalyst that may reside in the hydroconversion reaction zone will vary depending upon the type and activity of the catalyst selected. For example, the amount of catalyst can be as low as about 30 ppm (based upon the weight of all feed materials in the reactor) when a high activity catalyst such as a cobalt or molybdenum based catalyst is used. It is also possible that the hydroconversion reaction will include up to about 10 weight percent of a low activity catalyst. For example, a large amount of an iron based catalyst system supported on an inorganic base material would likely be needed to be effective in a hydroconversion reaction zone because of its low activity. The ultimate choice of hydroconversion catalyst and the amount used will depend upon one or more factors including, but not limited to cost, activity, and susceptibility to fouling and poisoning and so forth.

It is preferred that the catalyst used in the methods and the hydroconversion reaction zones of this invention are micro particulate dispersed metal catalysts and in particular sulfides of micro particle dispersed metal catalyst such as iron, molybdenum, cobalt, vanadium and other Group IV-VIII metals. The micro particulate dispersed metal catalyst and any other solid particulate catalysts used in the present invention will typically have an average mesh size of greater than 50, more preferably greater than 100 mesh and most preferably greater than 200 mesh. If the catalyst is sulfided, then the catalyst may be pre-sulfided before it is introduced into the reaction zone or it may be sulfided in-situ for example by adding elemental sulfur or a sulfur containing gas or composition into the hydroconversion reaction zone.

Additional additives can be added to or combined with the catalyst in order to improve combined feed conversion. For example, it might be useful to associate the catalyst with non-metallic refractory materials like carbon absorbents, silica, alumina, clays and similar materials. The catalysts may be associated with the refracting materials by well known methods such as impregnation, dry mixing, adding the catalyst and refracting materials separately into the reaction zone and so forth. Other known additives that enhance catalytic activity or that inhibit catalyst deactivation can also be added to the catalyst or to the hydroconversion reaction zone. In addition, since water is present in the combined feed, additives that bind with water or that control the reaction pH can optionally be added into the reaction zone. Ultimately, any additives known to one skilled in the art for being useful in conjunction with the types of catalysts or the types of process used in the present invention can be added into the reaction zone or combined with the feeds or catalysts introduced into the hydroconversion reaction zone.

A hydrogen containing gas is added to the hydroconversion reaction zone to maintain the hydroconversion pressure within the desired range. The hydrogen containing gas may be essentially pure hydrogen or it may include additives such as hydrogen sulfide impurity or recycle gasses such as light hydrocarbons. Reactive or non-reactive gases may be combined with hydrogen and introduced into the hydroconversion reaction zone to maintain the reaction zone at the desired pressure and to achieve the desired hydroconversion reaction product yields.

The hydroconversion reaction zone of this invention may be selected from any type of hydroconversion reactor that is useful for converting low value heavy hydrocarbons into high value lighter hydrocarbons. The hydroconversion reaction zone may include a fixed bed catalyst or it may include a dynamic catalyst bed such as an ebulated bed, fluidized bed or slurry bed of catalyst. In general, it is anticipated that fixed bed catalyst systems will not be very useful in processing the combined feeds of the present invention because the biorenewable hydrocarbons feedstock will typically be a solid particulate material that will quickly foul the catalyst and plug the reactor. A fixed catalyst bed hydroconversion reaction process may be used where a very small amount, such as a surfactant acting amount or slightly more of the biorenewable feedstock is introduced into the hydroconversion reaction zone. Otherwise, the hydroconversion reaction zone will preferably be a dynamic catalyst bed reaction zone such as a fluidized bed, ebulated bed or slurry phase catalyst containing reaction zone.

Some non-limiting examples of useful dynamic catalysts bed reaction systems useful in the present invention include, but are not limited to, the VEBA-combi-cracking process, M-coke technology as disclosed in U.S. Pat. No. 4,134,825 B1, the CANMET process which is disclosed for example in U.S. Pat. No. 4,299,685 B1, the SOC technology which uses highly dispersed super fine powder of transition metallic compounds at high reaction presses, the $(HC)_3$ process such as disclosed in U.S. Pat. No. 5,578,197 B1 and homogeneous catalysts hydroconversion reaction processes and methods such as those disclosed in U.S. Patent Application No. 2005/241993.

The combined feeds and catalysts of this invention may also be combined and hydroconverted in the processes and apparatuses described in U.S. Pat. No. 6,517,706 B1, the specification of which is incorporated herein by reference. The '706 patent discloses processes for converting a slurry feed of a heavy hydrocarbon feedstock and coke-inhibiting additive particles together with a hydrogen-containing gas. The slurried feed ingredients are fed upward through a confined hydrocracking zone in a vertical, elongated, cylindrical vessel with a generally dome-shaped bottom head. A mixed effluent is removed from the top containing hydrogen and vaporous hydrocarbons and liquid heavy hydrocarbons. The slurry feed mixture and a portion of the hydrogen-containing gas are fed into the hydrocracking zone through an injector at the bottom of the dome-shaped bottom head and the balance of the hydrogen-containing gas is fed into the hydrocracking zone through injection nozzles arranged within of the hydrocracking zone at a location above the slurry-feed injector. The combined slurry feed and hydrogen-containing gas are injected at a velocity whereby the additive particles are maintained in suspension throughout the vessel and coking reactions are prevented.

The hydroconversion reaction will take place at hydroconversion reaction conditions sufficient to obtain the desired light hydro carbon yield from the combined feed. The reaction conditions will generally include temperatures ranging from 300 to 600° C. More preferably from 350 to 500° C. and most preferably 425 to 500° C. The useful hydroconversion reaction pressures will typically range from about 1000 to about 3000 psig and more preferably from about 1200 to about 2500 psig.

Referring again to FIG. 1, the hydroconversion reactor/reaction zone 22 will generally include a gaseous product stream 28 and a slurry product stream 26. Slurry product stream 26 will generally be directed into a device 30 that effectively separates at least some of the solid material in the slurry from the liquid material. Device 30 may be a filter, slurry separators, centrifuges, distillation to remove the solids such as pitch, or any other device or apparatus used in hydrocarbon processing for separating or concentrating solids in a solids containing liquid stream. A liquid product stream 32 will be removed from hydroconversion reactor 22 and further processed in down stream processes to concentrate and recover high value hydrocarbons from the liquid product stream 32. In most cases, the liquid product stream will be used as is or will be separated and the separated components used as feed stocks for traditional refinery processes. Off gas 28, which may also contain high value light hydrocarbons will also be processed in traditional refinery processes to convert and/or recover high value materials such as light hydrocarbons, hydrogen and so forth. Both product streams 28 and 32 can also be processed in down stream processes to remove unwanted contaminants such as water, sulfur, oxygen, and so forth from the streams.

Device 30 also forms a concentrated slurry stream that can include solid catalyst and that will include solid biorenewable feedstock that was not converted into a liquid or gaseous product in the hydroconversion reactor. A portion of the concentrated slurry stream formed device 30, possibly containing solid catalyst, can be a recycle stream 34 that is directed back into hydroconversion reactor 22. In addition, an amount of the concentrated slurry formed in device 30 ranging from a slip stream to all of the concentrated slurry can be removed from the process via 36 for separation, pitch removal processing and/or disposal.

It has been surprisingly discovered that directing a combined feed described above including a low value petroleum derived hydrocarbon feedstock with at least one biorenewable feedstock and reacting the combined feed in a hydroconversion reaction zone has the synergistic effect of forming a product stream that yields one or more liquid or gaseous products in amounts greater on a yield weight percent basis than the hydroconversion products yields of the individual combined feed ingredients alone using the same catalyst at the same hydroconversion reaction zone conditions. The synergistic yield effect may manifest itself in the improvement in wt % yields of one or more desirable hydroconversion reaction products and/or the reduction in yields of one or more undesirable reaction products and/or the reduction of undesirable compounds in the hydrocarbon reaction products. The one or more yields that could be synergistically improved by the methods and reactors of the present invention include, but are not limited to naphtha yields (B.P 204-343° C.), and heavy liquid yields (B.P. 343-524° C.). The one or more yields that might be synergistically depressed include, but are not limited to solids yield and light gas yield (B.P. less than 204° C.). The one or more undesirable reaction products that might be synergistically reduced in the hydrocarbon reaction products include, but are not limited to water and oxygen.

The following U.S. patents are expressly incorporated into this specification by reference: U.S. Pat. Nos. 4,194,967 B1; 4,226,742 B1; 4,824,821 B1; 4,740,925 B1; 5,578,197 B1; 6,139,723 B1; 4,134,825 B1; 4,299,685 B1; 5,578,197 B1 and 6,517,706 B1.

This invention has been discussed generally with reference to the drawing. The drawing depicts particular embodiments of the invention and are not intended to limit the generally broad scope of the invention as set forth in the claims.

EXAMPLES

Example 1

The runs discussed below were performed in a batch reactor. To the reactor was added heavy vacuum residue from a Ural crude (ASTM 1050 of 85%+), alone or with lignin AT obtained as a waste product from the Kraft process. The feed ingredient(s) were slurried with a catalyst selected from a powdered bauxite (1% Fe) catalyst or 1% of an oil soluble molybdenum compound, Molyvan—molybdenum di(2-ethylhexyl)phosphorodithioate in petroleum process oil—at 150° C. with elemental sulfur. The slurry was heated to 320° C. for 60 minutes and then ramped to 450° C. and held for 80 minutes under flowing hydrogen at 2000 psig.

One run was performed with 300 g Ural feed plus catalyst as a control. A second run was performed with 300 g Ural feed, and 60 g of powered solid lignin-AT. The light reactor products were collected in a knock out vessel and heavy products and by-products were collected from the reactor.

The runs with 1% Fe as bauxite catalyst formed hard solids in the reactor. The product yields were not good and no synergistic effect was seen. This result suggests that an insufficient amount of iron catalyst was used.

The molybdenum catalyst (Molyvan) performed much better likely due to its higher activity. The yield data for the Ural crude and the combined Ural crude/lignin AT are reported at Table I below. A product analysis shows significant deoxygenation of the lignin based upon a comparison of the total product yields. Moreover, the overall solids produced in the reaction using the combined feed were lower than observed with Ural feed alone demonstrating that the lignin AT may have enhanced the Ural feed hydroconversion. The weight percent yield of product boling in the range of transportation fuel (204-343° C.) was higher for the lignin and resid than for the resid alone.

The overall solids produced in the combined feed reaction were lower than that observed with Ural Feed alone demonstrating that the Lignin addition actually enhanced the conversion of the Ural resid.

The oxygen content of the heavy product was reported to be 0.87 wt % which is surprising low given the high oxygen content of the lignin. Based on the elemental analysis we accounted for 75% of the feed oxygen, most of it in the aqueous phase. This indicates that most of the oxygen has been removed as water from the hydrocarbon. The remaining oxygen is believed to have been in the light gas phase which was not specifically analyzed for elemental composition.

The H-1 NMR results show that the lignin derived products are significantly more aromatic than the products from the heavy oil feed alone. The naphtha product had double the aromatic hydrogen content which should greatly improve the octane product.

TABLE I

|  | B.P. Range | Ural Vac Bottoms | wt % Feed | Grams Oxygen Product | Ural Vac Bottoms + Lignin | wt % Feed | Grams Oxygen Product |
|---|---|---|---|---|---|---|---|
| Oxygen in Feed (g) |  | 5.2 | 1.6 | x | 18.6 | 4.8 |  |
| Light Gas | <204° C. | 58.1 | 18.1 |  | 64.1 | 16.7 |  |
| Grams Solids |  | 10.4 | 3.2 |  | 11.9 | 3.1 |  |
| Grams Heavy Liquid | 343-524° C. | 211.6 | 65.9 | 1.4 | 218.1 | 56.8 | 1.6 |
| Grams Naphtha | 204-343° C. | 51.4 | 16.0 | 0.4 | 77.9 | 20.3 | 0.9 |
| Grams H2O |  | 3.7 | 1.1 | 3.2 | 12.7 | 3.3 | 11.2 |
| Total |  | 321.0 |  | 5.0 | 384.6 |  |  |

The following observations can be made from the results reported above.

1. The oxygen content of the naphtha and heavy liquid were not increased significantly by the lignin and a significantly higher amount of water was collected. This indicates that the phenolic and oxygen compounds in the lignin were deoxygenated in the process significantly improving the fuel quality of the resulting liquid.
2. The naphtha yield was significantly higher for the combined lignin and resid feed. The starting lignin was 60% carbon and 31% oxygen.

This corresponds to greater than 90% of the carbon in lignin being converted to a liquid fuel range product.

3. The yields of lower value solids and light gas products were lower on wt % basis for the experiment with lignin than without lignin.
4. The experiments with the soluble Moly catalyst produced predominantly liquid product.

Assuming that yields of Ural conversions unaffected by Lignin, then the 60 grams of solid particulate Lignin converted as follows:

| 9.2 grams water | 15% |
| 8 grams Light HCBN gas | 14% |
| 1 gram solid | 2% |
| 26 grams Light Liquid Product (<343° C.) | 44% |
| 14 grams Heavy Liquid Product (343-524° C.) | 23% |

Example 2

200 grams of a $C_{14}$-$C_{18}$ paraffin mixture, 100 grams of a Kraft lignin and 36 grams of a commercial Ni—Mo/Al2O3 hydrotreating catalyst were loaded in a 500 cc autoclave. The autoclave was pressured up to 1500 psig with $H_2$ while stirring the content and the temperature was raised. After 2 hours at 350° C. with flow-through $H_2$, the products in the autoclave and dry-ice trap were weighed and analyzed. The lignin contained 30% water but of the water-free lignin 70% conversion to char had occurred, about 25% to $CO/CO_2$/water/$C_1$-$C_5$ and less than 5% to liquid hydrocarbon.

In another experiment, a high-boiling wax was used as suspension liquid to prevent the suspension phase from leaving the autoclave during the experiment. To prevent cracking reactions from complicating the analysis the temperature was reduced to 300° C. To compensate for the lower temperature, the amount of hydrotreating catalyst was doubled. The amounts in this experiment were 100 grams of wax, 100 grams of lignin and 80 grams of catalyst. The lignin conversion was similar as in the experiment above. 75% had converted to char, up to 6% conversion to hydrocarbon was found, while the rest ended up as products like CO, $CO_2$, water and light ends.

The results of this experiment indicate that the synergistic effect is less pronounced or absent at least in some instances when the low value heavy hydrocarbon feed is waxy. In the presence of the waxy diluent the yield of naphtha from the biorenewable material is significantly lower than in the presence of the vacuum resid used in example 1.

The invention claimed is:

1. A process for converting a slurry feedstock to a liquid hydrocarbon stream comprising:
   a. combining a heavy hydrocarbon oil stream with at least one solid biorenewable feedstock to form a slurry feedstock;
   b. contacting the slurry feedstock with a catalyst in a reaction zone at hydroconversion reaction conditions for a period of time sufficient to form a hydroconversion reaction product comprising a liquid hydrocarbon stream; and
   c. withdrawing the hydroconversion reaction product from the reaction zone.

2. The method of claim 1 wherein the solid particulate biorenewable feedstock comprises a cellulose containing biological material.

3. The method of claim 1 wherein the biorenewable feedstock is present in the combined feed in an amount ranging from an surfactant acting amount of lignin to about 75 wt %.

4. The method of claim 1 wherein the biorenewable feedstock is present in the combined feed in an amount ranging from about 1 wt % to about 50 wt %.

5. The method of claim 2 wherein the solid biorenewable feedstock is selected from the group consisting of cellulose, hemicellulose, lignins and mixtures thereof.

6. The method of claim 5 wherein the lignin is selected from the group consisting of Kraft lignins, organosolve lignins, wood derived lignins, agricultural derived lignins, municipal derived lignins and mixtures thereof.

7. The method of claim 1 wherein the hydroconversion reaction zone is operated at hydroconversion reaction conditions comprising a temperature of from about 350° C. to about 500° C. and a pressure of from about 1000 psig to about 3000 psig.

8. The method of claim 1 wherein the heavy hydrocarbon oil comprises at least 80 wt % hydrocarbons having a boiling point greater than about 1050° F.

9. The method in claim 1 wherein the heavy hydrocarbon oil comprises at least 80 wt % hydrocarbons having a boiling point greater than 650° F. and comprises 10-50% aromatic hydrocarbons.

10. The method of claim 1 wherein the catalyst is a microparticulate dispersed metal catalyst.

11. The method of claim 10 wherein the catalyst comprises a sulfided metal catalyst.

12. The method of claim 10 where the microparticulate catalyst comprises at least one metal from Groups IV-VIII of the Periodic Table.

13. The method of claim 12 where the metal is selected from the group consisting of iron, cobalt, molybdenum, vanadium and mixtures thereof.

14. The method of claim 1 wherein one or more catalysts are added to hydroconversion reaction zone in order to maintain an amount of catalyst in the hydroconversion reaction zone within a range from about 30 ppm to about 10 wt %.

15. A method for improving the hydroconversion of a heavy hydrocarbon feedstock oil comprising the steps of:
   a. admixing from about 50 wt % to about 99 wt % of a heavy hydrocarbon oil with from about 1 wt % to about 50 wt % of at least one solid biorenewable feedstock to form a slurry feed;
   b. reacting the slurry feed with at least one microparticulate dispersed sulfided metal catalyst in a hydroconversion reaction zone at hydroconversion reaction conditions comprising a temperature of from about 350° C. to about 500° C. and a pressure of from about 1200 psig to about 2500 psig for a period of time sufficient to form a hydroconversion reaction product; and
   c. withdrawing the hydroconversion reaction product from the reaction zone wherein the hydroconversion reaction product includes a naphtha yield on a wt % product basis that is greater than the naphtha yield of on a wt % product basis of a straight heavy hydrocarbon oil feed at the same hydroconversion reaction conditions and using the same type and amount of hydroconversion catalyst.

* * * * *